United States Patent Office 3,540,917
Patented Nov. 17, 1970

3,540,917
WATERPROOFED FLEXIBLE FIBROUS ARTICLE
AND METHOD OF PRODUCING THE SAME
Maurice I. Seifer, Levittown, and Chien-Pen Lo, Philadelphia, Pa., assignors to Rohm & Haas Company, Philadelphia, Pa., a corporation of Delaware
No Drawing. Filed Jan. 16, 1968, Ser. No. 698,113
Int. Cl. B44d 1/14
U.S. Cl. 117—76
2 Claims

ABSTRACT OF THE DISCLOSURE

A method of waterproofing a flexible, fibrous article and the waterproofed article, which method comprises applying to the article a first composition of a copolymer having a $T_i$ in the range of $-50°$ C. to $+15°$ C. and a second composition of a copolymer having a $T_i$ in the range of $-50°$ C. to $+40°$ C., wherein the first composition provides a relatively softer and more flexible coating than the second.

---

This invention concerns improved coating compositions adapted to produce solvent-resistant coatings on flexible fibrous bases, especially those of textiles, leather, and paper. It also concerns the coated products and the methods for making them using the new coating compositions.

It has heretofore been proposed to include various thermosetting materials such as melamine-formaldehyde condensates in coating compositions based on polyacrylates but, in general, such materials suffer one or more difficulties such as poor compatibility, inadequate capacity to render the coating insoluble, or excessive stiffening action when applied in sufficient proportions to give adequate resistance to solvents.

In accordance with United States Pat. 3,025,181, fabrics and other materials have been rendered waterproof by the application of an undercoat of an acrylic copolymer containing 1 to 10% of glycidyl methacrylate with or without up to 10% of cellulose acetate butyrate or propionate and a topcoat of a glycidyl methacrylate copolymer mixed with one of the aforementioned cellulose esters.

It is an object of the present invention to provide a coating composition which is adapted to be cured to a solvent-resistant condition without appreciably reducing the flexibilty of the substrate to which it is applied. Another object of the present invention is to provide an improved multiple-layer coating system for such flexible fibrous articles. Other objects and advantages will be apparent from the description hereinafter.

In accordance with the present invention, it has been discovered that a composition comprising a mixture of (a) a copolymer of copolymerizable monoethylenically unsaturated monomers comprising about 1 to 4% by weight of acrylic acid, methacrylic acid or itaconic acid and about 1 to 4% by weight of a hydroxy ($C_2$—$C_3$) alkyl acrylate or methacrylate, with the proviso that the total of acid monomer and hydroxy-containing monomer does not exceed 6% by weight of the copolymer with (b) a condensate of formaldehyde with melamine or urea when applied appropriately in a multicoat system is capable of producing a water-repellent or waterproof finish that is resistant to solvents and does not stiffen the fabric material objectionably. The proportion of (b) may be from 5 to 15% by weight of the entire mixture of (a) and (b) in the compositions that are employed for the several coats.

In the simplest multicoat system consisting of a single undercoat and a single topcoat, the first composition applied is selected to provide a relatively softer and more flexible coating whereas the second is selected to provide a somewhat harder though still flexible topcoat that is free from any tacky feeling. The relative softness, flexibility, and freedom from tack in each coat may be predetermined by selecting or controlling one or more of several factors; for example:

(1) The same copolymer may be used in both the under- and topcoats and it may be blended with a relatively small proportion (say 5 to 8%) of the aminoplast component (b) to make the undercoat and a relatively large amount (say 9 to 15%) of the aminoplast to provide the topcoat. In this instance, the copolymer may have an apparent second order transition temperature, $T_i$, in the range of about $-50°$ C. to a maximum of about 15° C.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$. Examples of monoethylenically unsaturated comonomers that can be copolymerized with the acid and hydroxyalkyl acrylate or methacrylate monomers to provide copolymers having a $T_i$ in this range are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, n-amyl methacrylate, sec-amyl methacrylate, hexyl, methacrylate, 2-ethylbutyl methacrylate, octyl methacrylate, 3,5,5-trimethylhexyl methacrylate, decyl methacrylate, dodecyl methacrylate, octadecyl methacrylate, and butoxyethyl acrylate or methacrylate. These monomers form soft homopolymers and copolymers formed from two or more of them exclusively are also soft. Such polymers have $T_i$ values below 20° C.

Examples of monoethylenically unsaturated comonomers that form hard homopolymers which have $T_i$ values of 20° C. or higher are alkyl methacrylates having alkyl groups of not over four carbon atoms, also tert-amyl methacrylate, tert-butyl or tert-amyl acrylate, cyclohexyl or benzyl acrylate or methacrylate, acrylonitrile or methacrylonitrile, these constituting a preferred group of the compounds forming hard polymers. Styrene, vinyl-toluene, vinyl chloride, chlorostyrene, vinyl acetate, and p-methylstyrene also form hard polymers. Other specific compounds forming hard polymers are methyl methacrylate, ethyl methacrylate, propyl methacrylate, isopropyl methacrylate, butyl methacrylate, sec-butyl methacrylate, tert-butyl methacrylate, acrylamide, and methacrylamide.

It is frequently desirable to copolymerize the hydroxyl-containing monomer with a mixture of two or more different comonomers, one or more of which are selected from the hard category just mentioned and another of which is selected from the soft category. It is only necessary, when the same copolymer is to be used in both undercoat and topcoat, that the amount of hard monomer used does not raise the $T_i$ to a value above about 15° C.

(2) The copolymers used in the two coats may differ in the particular comonomers and the same aminoplast may be used in the same proportions. In this instance, a softer copolymer having a lower $T_i$ value is used in the undercoat. In this instance, the $T_i$ of the copolymer in the undercoat may be in the range of $-50°$ to 15° C. and that of the topcoat copolymer may be in the range of 0° C. to 40° C.

(3) The total proportion of functional monomers (acid carboxyl and hydroxyl) may differ in the copolymers used in the two coats, that in the undercoat having a lower total so that on curing a softer, more flexible undercoat is obtained.

(4) The undercoating composition may contain a copolymer having a relatively lower $T_i$ (−50° to 15° C. as compared to 0° to 40° C. in the topcoat) and also a lesser total of functional groups than the topcoating composition. In this instance, the amount of aminoplast may be the same in both composition, less in the undercoat, or even less in the topcoat.

Examples of the formaldehyde condensates or aminoplasts which can be used include diethoxymethylurea and butylated methylolated melamine, such as those containing from 3 to 6 moles of formaldehyde and from 3 to 5 moles of butanol in the condensate per mole of melamine.

Both the base coat or coats and the final coat or coats are applied from organic solvent solutions. The blend of the copolymer with the aminoplast may be at a concentration from 20 to 45% by weight in the solutions and as solvents any suitable solvents for the two materials may be employed. Examples include ethanol, isopropanol, butanol, xylene, toluene, cyclohexane, ethyl acetate, methyl acetate, n-propyl acetate, isopropyl acetate, butyl acetate, acetone, methyl ethyl ketone, dioxane, the methyl, ethyl, or butyl mono-ethers of ethylene glycol, 2-ethoxyethyl acetate, 2-ethoxyethyl propionate, or 2-ethoxyethyl butyrate. Mixtures of these solvents may be employed as desired.

A small amount of an acid catalyst, such as about 1.0 to 5% by weight of the copolymer present in the composition, may be employed. Examples of suitable catalysts include butyl phosphoric acid, p-toluene sulfonic acid, oxalic acid, maleic acid, the mono-salt of maleic acid with an amine, such as triethylamine or triethanolamine, the salts of various amines, such as the hydrochloride, the hydroacetate, or the maleate of 2-methyl-2-aminopropanol-1, diethanolamine, and so on.

Any suitable method of applying the coating to the fabric may be employed such as roll-coating, knife-coating, spraying, brushing, or dipping. The concentration and viscosity are, of course, adjusted to the particular method intended to be used in applying the coatings to the substrates.

The coatings may be applied in succession to the substrates. After application of each coating, it is dried and, if desired, subjected to a baking step to cure the copolymer on the coated substrate. In any event, the final drying is followed by a curing or baking which may be effected at a temperature of 220° to 450° F. for a period of time that may be anywhere from about ½ minute to ½ hour or longer, the shorter time generally being used at the higher temperature and vice versa. Drying may be by exposure to the ambient atmosphere, hot-air oven, infrared radiation, or by any other system.

The coatings may be applied to all sorts of textile fabrics, such as garments needing waterproofing. Thus, raincoats formed of nylon, vinyl resins, Dacron, cotton, rayon, or mixtures thereof can be rendered resistant to drycleaning as well as resistant to water and grease by the coating system herein disclosed.

The coatings are also useful for waterproofing or rendering water-repellent umbrellas, awnings, automobile seatcovers, knapsacks, and other items of textile fabrics. They may be used as well for the waterproofing of leather used in shoes, briefcases, and luggage of all sorts. Because of their grease-proofness and solvent resistance as well as their water-repellency, the coatings are useful as finishes for paper including paperboards, such as may be used for protective covers for books and the like.

The application of the undercoat or base coat prior to the application of the second coat is quite important. The composition first applied is relatively soft, forms an excellent bond with the base, and provides a high degree of flexibility in immediate proximity to the surfaces of the fibers upon which the base coat is applied. The topcoat is, as compared to the base coat, quite free from tackiness and provides a good exposed surface substantially free of grab, that is of the tendency to cling to any surface upon which the coated article is pressed. By providing a blend of aminoplast and a copolymer having hydroxyl and carboxyl groups reactive with the aminoplast in both coatings, resistance to drycleaning is imparted throughout the entire thickness of the coating. At the same time, this solvent-resistance is obtained without sacrifice of flexibility and draping qualities of the base particularly when it is a textile fabric forming part of a garment.

It is to be understood that the invention contemplates a coated article carrying (1) an undercoat which may consist of the deposit from a single application of the undercoating composition or from a plurality of applications thereof and (2) a topcoat which may consist of the deposit from a single application or from a plurality of applications of the topcoating composition.

As compared to the process of 3,025,181 that of the present invention has the advantages of freedom from butyric acid odor arising from the cellulose acetate butyrate, less intensity of curing needed (i.e., lower temperature or shorter times or both to get a given degree of solvent resistance), improved quality of fabric obtained in respect to appearance and hand, better resistance to the drycleaning solvent trichloroethylene, and generally better control of curing. Apparently, the presence of both carboxylic acid and alcoholic hydroxyl in the copolymers account for these improvements even though these reactive groups must be present at quite low levels which are appreciably lower than is customary in such coreactive (copolymer and aminoplast) systems in order to obtain good flexibility without stiffness and brittleness in the coated articles. Such coreactive copolymer/aminoplast systems had previously been recommended primarily for producing extremely hard coatings on rigid substrates.

To assist those skilled in the art to practice the present invention, the following modes of operation are suggested by way of illustration, parts and percentages being by weight and the temperatures in ° C. unless otherwise specifically noted.

(1) There are mixed 89.6 parts of a 50% solution in a solvent (55 xylene, 15 cyclohexane, and 30 isopropyl acetate) of a copolymer ($T_i$ about −25° C.) of 80% ethyl acrylate, 15% butyl acrylate, 3% β-hydroxypropyl methacrylate, and 2% of acrylic acid, 3.7 parts of a 60% solution in 50:50 xylene:butanol of butylated melamine formaldehyde (5 mols butanol/6 mols of formaldehyde/ melamine), 2.2 parts tricaprylamine p-toluene sulfonate as a catalyst and 4.5 parts n-butanol. This composition is knife-coated onto a Dacron (polyethylene terephthalate) taffeta fabric using a laboratory coating machine adjusted to provide about 0.33 ounce of dry solids per sq. yard of the fabric. The coated fabric is dried at 240° F. A second coat is applied in the same way and dried at 240° F. Then a topcoating is applied in the same way and dried at 240° F. The topcoating composition is a mixture of 89.6 parts of a 50% solution in a solvent (mixture of 55 xylene and 45 ethyl acetate) of a copolymer ($T_i$ about 36° C.) of 65% ethyl acrylate, 30% methyl methacrylate, 3% β-hydroxypropyl methacrylate, and 2% of acrylic acid, 3.7 parts of the 60% solution of the same butylated melamine formaldehyde condensate as in the undercoating composition, 2.2 parts of the same catalyst, and 4.5 parts of n-butanol.

The coated product is then cured for 3 minutes at 260° F. Test specimens were given five household washes (5 W) in an automatic washer set at 140° F. with Tide detergent, or five dry-cleanings in the Launder-O-Meter at room temperature with a solution of perchloroethylene or trichloroethylene. Washed and drycleaned test specimens were rated visually as excellent in respect to coating appearance as compared to the original coating. These specimens were then tested for hydrostatic pressure which measures the ability of coated fabrics to support a constantly rising water column. The height reached when three drops of water appear on the upper side of the fabric is recorded in centimeters of water. Test specimens after five household washes or five drycleanings in perchloroethylene show no water leakage at 100 centimeters of water (the limit of the equipment used) and are rated 100+ centimeters of water. Test specimens after five drycleanings in trichloroethylene show three drops of water at 85 centimeters of water. These results show excellent durability of the waterproof coating system.

(2) The procedure of (1) is repeated with similar results but with the butylated melamine condensate replaced by 4 parts of a 50% solution, in 50:50 xylene: n-butanol, of a butylated urea formaldehyde condensate (4 mols n-butanol/4 mols formaldehyde/1 mol urea).

(3) Procedure (1) is repeated except that the curing is effected at 320° F. for 3 minutes. This improved the durability, especially against drycleaning with trichloroethylene. Test specimens after five drycleanings in trichloroethylene show no water leakage at 100 centimeters of water.

(4) Procedure (1) is repeated except that the copolymer in the undercoating composition is a copolymer having a $T_i$ of about −27° C. of 70% ethyl acrylate, 16.5% 2-ethylhexyl acrylate, 10% styrene, 2% hydroxyethyl acrylate, and 1.5% itaconic acid. Similar results are obtained.

(5) The procedure of (4) is repeated except that the copolymer in the topcoating composition is replaced with a copolymer, having a $T_i$ of about 30° C., of 70% ethyl acrylate, 24% acrylonitrile, 3% 3-hydroxypropyl methacrylate and 3% methacrylic acid.

We claim:

1. An article of manufacture comprising a flexible fibrous base waterproofed by (A) a base coating, in adherent contact with at least the fibers at the surface of the base, comprising (1) a copolymer, having a $T_i$ in the range of −50° C. to +15° C., of copolymerizable monoethylenically unsaturated monomers comprising 1 to 4% by weight of acrylic acid, methacrylic acid, or itaconic acid, and 1 to 4% by weight of a hydroxyalkyl acrylate or methacrylate in which the alkyl group has 2 to 3 carbon atoms with the proviso that the total of monomers containing the carboxyl and hydroxyl groups does not exceed 6% by weight of the copolymer and (2) 5 to 15% by weight, based on the weight of the copolymer, of an alkylated condensate of formaldehyde with urea of melamine in which the alkylation is that obtained from an alcohol having 2 to 4 carbon atoms, and (B) a topcoating in adherent contact with the base coating, said topcoating comprising (1) a copolymer, having a $T_i$ in the range of −50° C. to +40° C., of monoethylenically unsaturated monomers comprising 1 to 4% by weight of acrylic acid, methacrylic acid, or itaconic acid, and 1 to 4% by weight of a hydroxyalkyl acrylate or methacrylate in which the alkyl group has 2 to 3 carbon atoms with the proviso that the total of monomers containing the carboxyl and hydroxyl groups does not exceed 6% by weight of the copolymer and (2) 5 to 15% by weight, based on the weight of the copolymer, of an alkylated condensate of formaldehyde with urea or melamine in which the alkylation is that obtained from an alcohol having 2 to 4 carbon atoms, the basecoat being relatively softer and more flexible than the topcoat, the coatings serving to waterproof the article and being in a cured condition resistant to solvents.

2. A method of waterproofing a flexible, fibrous article which comprises applying to the article a first coating composition comprising a solution in an organic solvent of (1) a copolymer, having a $T_i$ in the range of −50° C. to +15° C., of copolymerizable mono ethylenically unsaturated monomers comprising 1 to 4% by weight of acrylic acid, methacrylic acid, or itaconic acid, and 1 to 4% by weight of a hydroxyalkyl acrylate or methacrylate in which the alkyl group has 2 to 3 carbon atoms with the proviso that the total of monomers containing the carboxyl and hydroxyl groups does not exceed 6% by weight of the copolymer and (2) 5 to 15% by weight, based on the weight of the copolymer, of an alkylated condensate of formaldehyde with urea or melamine in which the alkylation is that obtained from an alcohol having 2 to 4 carbon atoms, drying the coated article, and subsequently applying a second coating compostion comprising a solution in an organic solvent of (1) a copolymer, having a $T_i$ in the range −50° C. to +40° C., of monoethylenically unsaturated monomers comprising 1 to 4% by weight of acrylic acid, methacrylic acid, or itaconic acid, and 1 to 4% by weight of a hydroxyalkyl acrylate or methacrylate in which the alkyl group has 2 to 3 carbon atoms with the proviso that the total of monomers containing the carboxyl and hydroxyl groups does not exceed 6% by weight of the copolymer and (2) 5 to 15% by weight, based on the weight of the copolymer, of an alkylated condensate of formaldehyde with urea or melamine in which the alkylation is that obtained from an alcohol having 2 to 4 carbon atoms, the first composition applied being selected to provide a relatively softer and more flexible coating whereas the second composition is selected to provide a somewhat harder though still flexible topcoat that is free from any tacky feeling, then drying the coated article, and curing the coatings thereon by heating to a temperature of 220° to 450° F. to render the coatings resistant to solvents.

References Cited

UNITED STATES PATENTS

| | | |
|---|---|---|
| 2,776,236 | 1/1957 | Staehle. |
| 2,790,736 | 4/1957 | McLaughlin et al. |
| 2,879,178 | 3/1959 | McWherter et al. _____ 117—76 |
| 3,025,181 | 3/1962 | Nuessle et al. |
| 3,307,965 | 3/1967 | Seifer et al. |

WILLIAM D. MARTIN, Primary Examiner

R. HUSACK, Assistant Examiner

U.S. Cl. X.R.

117—135.5, 138.8, 139.5, 142, 143, 145, 155